United States Patent [19]

Cheng

[11] 4,279,881

[45] Jul. 21, 1981

[54] CARBON BLACK PRODUCTION FROM SOLID CARBONACEOUS FEEDSTOCK

[75] Inventor: Paul J. Cheng, Bartlesville, Okla.

[73] Assignee: Phillips Petroleum Company, Bartlesville, Okla.

[21] Appl. No.: 106,200

[22] Filed: Dec. 21, 1979

Related U.S. Application Data

[63] Continuation-in-part of Ser. No. 860,801, Dec. 15, 1977, Pat. No. 4,206,175, which is a continuation of Ser. No. 690,810, May 27, 1976, abandoned, which is a continuation-in-part of Ser. No. 276,374, Jul. 31, 1972, abandoned.

[51] Int. Cl.$^3$ .......................... C01B 31/02; C09C 1/48
[52] U.S. Cl. ..................................... 423/456; 423/449; 423/450
[58] Field of Search ............... 423/449, 450, 455, 456, 423/458; 422/150

[56] References Cited

U.S. PATENT DOCUMENTS

| | | | |
|---|---|---|---|
| 3,076,695 | 2/1965 | Classen | 422/150 |
| 3,975,504 | 8/1976 | Cheng | 423/456 |

Primary Examiner—O. R. Vertiz
Assistant Examiner—Gregory A. Heller

[57] ABSTRACT

In an aspiration chamber of a carbon black reactor, the discharge end of a hydrocarbon inlet and the aspiration inlet of a hydrocarbon reaction section are arranged in such a proximate relationship that the hydrocarbon feed entering from said inlet into said reaction section aspirates surrounding hot combustion gases. The aspiration chamber has a wall converging from the end to which the reaction section is attached towards the end to which the hydrocarbon inlet is attached. Inlets for the combustion gases comprising coal are provided for the tangential feed of the combustion gases into the annulus formed between the reaction section and the converging wall of the aspiration chamber. At least one ash outlet for discharging the ash from the chamber is arranged upstream of the discharge end of the hydrocarbon feed means.

8 Claims, 2 Drawing Figures

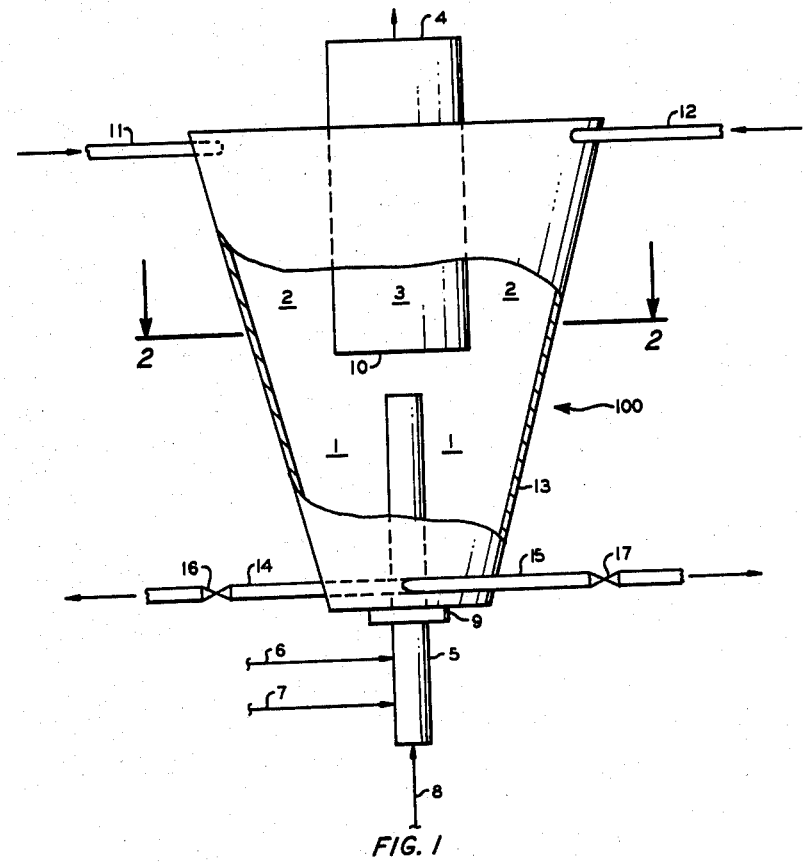
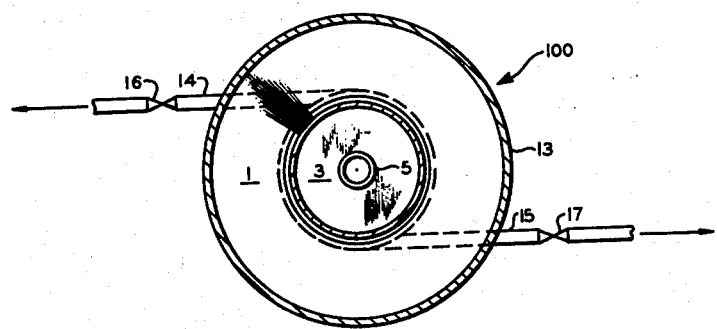
FIG. 1
FIG. 2

CARBON BLACK PRODUCTION FROM SOLID CARBONACEOUS FEEDSTOCK

BACKGROUND OF THE INVENTION

This application is a continuation-in-part of my copending application Ser. No. 860,801, filed Dec. 15, 1977, now U.S. Pat. No. 4,206,175, which in turn is a continuation of my copending application Ser. No. 690,810, filed May 27, 1976, now abandoned which in turn is a continuation-in-part of my application Ser. No. 276,374, filed July 31, 1972, now abandoned.

This invention relates to the production of carbon black from an ash-forming solid carbonaceous material such as coal, lignite, coke, comminuted cellulosic solids and the like, as particularly exemplified herein by coal.

In one of its more specific aspects, this invention relates to a method for producing carbon black from coal.

The production of carbon black by the pyrolysis of coal involving temperatures of about 900°–1600° C. is well known. Such processes involve introducing coal particles into a reaction zone, carbonizing the coal by contacting it with hot combustion gases produced by the oxidation of a fuel with an oxidant and recovering the carbon black formed by the pyrolysis.

The coal can be introduced as the feed independently of, or in combination with, other feeds. Similarly, coal can be employed as the fuel, independently of or in combination with other fuels.

One of the limitations of such processes is that the carbon black almost invariably contains particles of ash which is formed as a residue from the pyrolysis of the coal. Accordingly, any carbon black production system which could be carried out employing coal but minimizing the ash content of the carbon black product would popularize the use of coal for the production of carbon black. The method and apparatus of this invention act to do so.

According to the invention, there is provided a method of producing carbon black which comprises introducing a hydrocarbon feed into a carbon black reactor and introducing a hot combustion mass comprising hot combustion gases, coal and ash tangentially into the reactor through the circumferential periphery thereof. The hot combustion mass is caused to flow peripherally to and in a direction generally opposite to the flow of the hydrocarbon feed at a velocity sufficient to cause the ash to flow proximate the wall of the reactor. The hot combustion gases are separated from the principal portion of the ash and comingled with the feed to form a hot reactant mass. This reactant mass is caused to flow in a direction generally opposite to the flow of the hot combustion mass through the reactor. Contact between the hot combustion gases and the hydrocarbon feed brings the hydrocarbon feed to carbon blackforming temperature and forms carbon black which is recovered from the reactor. Ash is recovered from the reactor as a stream withdrawn proximate the hydrocarbon feed inlet end of the reactor.

By means of the tangential introduction of the hot combustion mass into the reactor, the mass is caused to flow in a helical flow path through the reactor. This helical flow path, in combination with the velocity of flow of the hot combustion mass, causes a principal portion of the ash to flow proximate the inner wall of the reactor and a principal portion of the hot combustion gases to separate from the ash. As a result of the flow patterns thus established, the principal portion of the hot combustion gases can be separated from the ash and unburned coal and can be introduced into contact with the hydrocarbon feed to produce carbon black containing minimal quantities of ash.

Also according to this invention there is provided a reactor for the production of carbon black which comprises a walled chamber having a hydrocarbon feed inlet end adapted with hydrocarbon inlet conduit for the introduction of a hydrocarbon feed and a carbon black recovery end adapted with an outlet for the recovery of carbon black. Inlet ports open into the reactor proximate the carbon black recovery end of the reactor. A reaction section, having an inlet end in spaced relationship to the hydrocarbon inlet conduit, forms an annulus between the internal walls of the reactor and the external walls of the reaction section. The reactor is adapted at the hydrocarbon feed inlet end upstream of the reaction zone with conduits discharging from the reactor. The walls of the reactor are disposed angularly inward from the carbonblack recovery end of the reactor to the hydrocarbon feed inlet end.

In accordance with one embodiment of this invention, there is provided a carbon black reactor comprising a walled chamber having an axis. The walls are sloping inwardly. The chamber has a feed inlet and a carbon black outlet. A tubular reaction section is arranged coaxially with and at least partially within the chamber. The tubular reaction section has an axially arranged aspiration end having an internal diameter of D inches. The tubular reaction section forms an annular combustion section between the interior of the walls of the chamber and the exterior of the reaction section arranged inside of the chamber. First means for the introduction of hydrocarbon feedstock in essentially axial direction are provided for. These first means have an internal discharge diameter d, which is related to the Diameter D of the aspiration end of the reaction section by the relationship $$d \leq \tfrac{1}{2}D.$$

Preferably d is in the range of 0.1D and 0.5D. The hydrocarbon discharge end of the first means is located proximate to the aspiration end of the reaction section. The axial distance between the discharge end of the first means and the aspiration end of the reaction section is in the range of $-\tfrac{1}{2}D$ to $+\tfrac{1}{2}D$. This means that the discharge end of the first means can be inserted into the aspiration end of the reaction section in an axial length of up to $\tfrac{1}{2}$ of the internal diameter of this aspiration end of the reaction section and can be arranged at an axial distance from this aspiration end of up to $\tfrac{1}{2}$ of the internal diameter of the aspiration end. The hydrocarbon feed discharge end can be arranged at any location between these extremes. This proximate arrangement of the hydrocarbon feed discharge end and the aspiration end during the operation causes the hydrocarbon feed stream to aspirate the hot combustion gases formed by the combustion in the annular combustion section. Second means for the tangential introduction of a combustion mass comprising hot combustion gases and ash into the annular space are also provided for. There is at least one ash outlet to remove ash from the chamber. The tangential introduction of the combustion mass into the chamber causes the ashes to be separated from the hot combustion gases and to be accumulated at the walls of the chamber. Therefore, essentially ash-free hot combustion gases are aspirated into the reaction section. The chamber thus acts both as a precombustion chamber and as a cyclone-type separator to separate the ashes from the hot combustion gases. Preferably the walls of the chamber are essentially frustoconically shaped. The angle between frustoconically shaped walls and the reactor axis is most preferably in the range of about 15°–30°.

The method of this invention employs any conventional hydrocarbon feedstock, the feedstock being introduced axially into the reactor which is preferably vertically positioned such that the feedstock is introduced upwardly, the upstream confining wall being the lower horizontal wall, and the downstream confining wall being the upper horizontal wall.

The coal is employed as a fuel and is introduced in the pulverized state, preferably at about 200 to 400 mesh. Preferably, coal with a low ash content is employed, the ash content being less than about 8 percent. The coal and oxidant are introduced into the reactor through the circumferential periphery of the reactor at a velocity which imparts sufficient centrifugal force to the ash to cause it to flow adjacent the wall of the reactor. The hot combustion mass formed from the burning of the coal travels in a direction generally opposite to the flow of the hydrocarbon feed for a considerable portion of the reactor length. Thereafter, the hot combustion gases of the hot combustion mass are comingled with the hydrocarbon feed and are caused to reverse their direction of flow and pass into the reaction section of the reactor with the hydrocarbon feed. Ash produced from the coal continues to flow towards the upstream end of the reactor and is withdrawn form the reactor.

The hydrocarbon feed and the hot combustion gases enter the reaction section of the reactor wherein the major conversion of the hydrocarbon feed to carbon black takes place and the carbon black is recovered from the reactor in the conventional manner.

While the velocity at which the hot combustion mass and the coal and ash contained therein are caused to flow will depend upon certain dimensions of the reactor, the velocity of the flow of the hot combustion mass will be, as measured under standard conditions of temperature and pressure, about 20 feed per second minimum; the greater the velocity, the greater the separation of ash and the less likely is the inclusion of ash and uncombusted coal in the carbon black product.

The method and apparatus of the present invention will be more easily understood if explained in conjunction with the attached drawing in which FIG. 1 represents a view in elevation of a vertically positioned reactor and FIG. 2 represents a horizontal cross section of the reactor through section 2—2 of FIG. 1.

Referring now to FIG. 1, there is shown reactor 100 comprised of feed inlet section 1, combustion section 2, reaction section 3, and carbon black outlet 4.

The feed inlet section is adapted with inlet manifold 5 through which conduits 6, 7 and 8 can discharge to introduce hydrocarbon feed, fuel such as natural gas, and an oxidant, such as air, into the reactor. These reactants can be any of those conventionally employed in carbon black production.

Reaction section 3 is formed of a conduit which is preferably of circular configuration. It forms combustion section 2 between its outer wall and the inner wall of the reactor. Its inlet end 10 is positioned proximate the discharge end of the conduit manifold at any suitable distance such that those materials discharged from the inlet manifold 5 act to aspirate the hot combustion gas from the combustion section into the reaction section. Various aspirating effects can be produced by adjusting the position of the discharge end of the inlet manifold by means of packing gland 9.

Hot combustion gases are introduced into the reactor by burning pulverized coal in inlet conduits 11 and 12 which communicate with the combustion section through the circumferential periphery of the reactor. While two such conduits are shown, any number can be employed. These conduits discharge into the reactor so as to cause the hot combustion gases, coal and ash to flow circumferentially helically around reaction section 3 at velocities sufficient to cause the ash flow proximate the inner wall of the reactor.

Preferably, the walls 13 of the reactor will slope inward uniformly along their length toward the upstream end of the reactor at such an angle as to compensate for the tendency of the velocity of the gases within the combustion section to decrease. Generally, an inward slope of from about 15° to about 30° from the vertical, depending upon the length of the reactor employed, will be sufficient.

As the hot combustion mass comprising the hot combustion gas, the coal and the ash reaches the inlet to the reaction section, some portion of the mass is caused to enter thereinto and into contact with the hydrocarbon feed. This contact brings the hydrocarbon feed to its decomposition temperature and converts it to carbon black which is recovered through the outlet end of the reactor.

The solids of the hot combustion mass comprising unburned coal and ash continue upstream and are removed from the reactor through conduits 14 and 15. These conduits can be positioned to discharge tangentially from the reactor or they can be positioned to discharge at an angle to the wall of the reactor. In order to minimize the escape of combustion gases from the reactor through these conduits, the conduits can be adapted with closure means 16 and 17 which facilitate the collection of the solid particles which can be removed intermittently from the system. The apparatus can be operated with no outflow from the lower end of the vertical vessel until interference of collected solids with the flow patterns within the vessel is threatened.

The following calculated example illustrates the best mode for carrying out a carbon black process in a preferred embodiment of the reactor.

A reactor having a length of 40 inches from its upstream wall to the outlet from the reaction section has a diameter of 37 inches at the locus of introduction of the hot combustion mass and a diameter of 15 inches at the locus of ash removal. The reaction section is comprised of a cylindrical tube having a diameter of 12 inches. The tube is extended upstream of the hot combustion mass inlet to the reactor a distance of 24 inches. The inlet manifold, through which hydrocarbon feed, air and natural gas are introduced, has an outlet diameter of 3 inches and is positioned to discharge at the inlet to the tube forming the reaction section. The axial distance between the outlet of the manifold and the inlet of the reaction section is about 4 inches.

A hydrocarbon oil is introduced through the inlet manifold at a rate of 290 gph. About 4000 SCFH of air and about 1250 SCFH of natural gas are also introduced through the inlet manifold.

Powdered coal of about 300 mesh having a heating value of 13,500 BTU/# and containing 8 weight percent ash is burned with 170,000 SCFH air. The hot combustion mass so formed is introduced into the combustion section through two tangential inlets which discharge into the combustion section at a velocity of about 60 feed per second. Production is conducted at a temperature of about 2400° F. at about ½ psig.

It can be estimated that the carbon black which would be recovered from the reactor would have a dibutylphthalate structure of about 100 cc/gm, and a nitrogen surface area of about 90 m$^2$/gm at a photelometer of about 80.

It will be evident from the foregoing that various modifications can be made to the reactor and method of this invention. Such are considered, however, to be within the scope hereof.

I claim:

1. A process for producing carbon black comprising:
   a. introducing a hydrocarbon feed upward in essentially axial direction into the aspiration end of a reaction section arranged coaxially within a carbon black reactor having a vertical axis;
   b. introducing a hot combustion mass comprising hot combustion gases, solid carbonaceous material, and ash into said reactor, said hot combustion mass being produced by the oxidation of solid carbonaceous material, said hot combustion mass being introduced tangentially into said reactor;
   c. passing said hot combustion mass in a path surrounding the reactor axis in an essentially helically shaped line through said reactor at a velocity sufficient to cause a principal portion of said ash to flow proximate the inner wall of the reactor, said hot combustion mass being passed in a direction generally opposite to the direction of injection of the hydrocarbon feed;
   d. separating hot combustion gases from said hot combustion mass and passing the hydrocarbon feed and the hot combustion gases separated from the combustion mass into said reaction section, thereby mixing the hot combustion gases with the hydrocarbon feed in said reaction section to cause the decomposition of the hydrocarbon feed and the formation of the carbon black;
   e. removing ash from the base of said reactor at least intermittently and
   f. recovering carbon black from said reaction section.

2. A process of claim 1 in which said hot combustion mass is passed angularly upstream towards the locus of introduction of said hydrocarbon feed.

3. A process of claim 1 in which said hot combustion mass is passed in said helical flow path at a velocity of not less than about 20 feed per second.

4. A process of claim 1 in which said hot combustion gases are aspirated into contact with said hydrocarbon feed.

5. A process of claim 2 in which said hot combustion means is passed in said helical flow path at a velocity of not less than about 20 feet per second and said hot combustion gases are aspirated into contact with said hydrocarbon feed.

6. A process of claim 1 in which the aspiration end of the reaction section has an internal diameter of D and the hydrocarbon feed is discharged in essentially axial direction at a location having a distance from the aspiration end of the reaction section within the range of −0.5D and +0.5D.

7. A process of claim 1 in which the solid carbonaceous material is coke.

8. A process of claim 1 in which the solid carbonaceous material is coal.

* * * * *

UNITED STATES PATENT AND TRADEMARK OFFICE
CERTIFICATE OF CORRECTION

PATENT NO. : 4,279,881

DATED : July 21, 1981

INVENTOR(S) : Paul J. Cheng

It is certified that error appears in the above–identified patent and that said Letters Patent are hereby corrected as shown below:

Column 6, line 24, "means" should read as "mass".

Signed and Sealed this

Third Day of November 1981

[SEAL]

Attest:

GERALD J. MOSSINGHOFF

Attesting Officer           Commissioner of Patents and Trademarks